(12) United States Patent
Islam et al.

(10) Patent No.: US 11,533,736 B2
(45) Date of Patent: **\*Dec. 20, 2022**

(54) SYSTEM AND METHOD FOR COEXISTENCE OF GRANT-FREE AND GRANT-BASED UPLINK TRAFFIC

(71) Applicant: Huawei Technologies Co., Ltd., Shenzhen (CN)

(72) Inventors: Toufiqul Islam, Sunnyvale, CA (US); Kelvin Kar Kin Au, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,256

(22) Filed: May 15, 2019

(65) Prior Publication Data

US 2019/0335484 A1     Oct. 31, 2019

Related U.S. Application Data

(63) Continuation of application No. 15/142,638, filed on Apr. 29, 2016, now Pat. No. 10,299,283.

(51) Int. Cl.
*H04W 72/12* (2009.01)
*H04W 74/08* (2009.01)
(Continued)

(52) U.S. Cl.
CPC ....... *H04W 72/1215* (2013.01); *H04L 5/0044* (2013.01); *H04W 72/04* (2013.01);
(Continued)

(58) Field of Classification Search
CPC .. H04W 72/1215; H04W 72/04; H04W 74/08
See application file for complete search history.

(56) References Cited

U.S. PATENT DOCUMENTS

2010/0128687 A1\* 5/2010 Oteri ............... H04L 1/1887
                                                                    370/329
2014/0254544 A1\* 9/2014 Kar Kin Au ........ H04L 1/1812
                                                                    370/330
(Continued)

FOREIGN PATENT DOCUMENTS

CN        103748907 A      4/2014
CN        105284172 A      1/2016
(Continued)

OTHER PUBLICATIONS

Huawei, HiSilicon, "UL Grant-free transmission," 3GPP TSG RAN WG1 Meeting #88, R1-1701665, Athens, Greece, Feb. 13-17, 2017, total 16 pages.

(Continued)

*Primary Examiner* — Omer S Mian
(74) *Attorney, Agent, or Firm* — Slater Matsil, LLP

(57) ABSTRACT

Systems and methods of scheduling grant-based traffic and mapping resources for grant-free traffic are provided. Grant-based traffic is scheduled in a first frequency partition, and grant-free traffic is mapped in a second frequency partition. In a first option, grant-based traffic is also scheduled in part of the first partition, but in a limited manner that ensures a given device's transmission and retransmissions do not all experience interference with the grant-based traffic. In another option, some grant-free traffic is mapped to part of the second partition and is spread in frequency across the second partition.

16 Claims, 14 Drawing Sheets

(51) Int. Cl.
*H04W 74/04* (2009.01)
*H04L 5/00* (2006.01)
*H04W 72/04* (2009.01)

(52) U.S. Cl.
CPC ....... *H04W 72/1268* (2013.01); *H04W 74/04* (2013.01); *H04W 74/08* (2013.01)

(56) References Cited

U.S. PATENT DOCUMENTS

| | | |
|---|---|---|
| 2014/0269663 A1 | 9/2014 | Nikopour et al. |
| 2014/0308954 A1 | 10/2014 | Wang et al. |
| 2014/0369434 A1 | 12/2014 | Taherzadehboroujeni et al. |
| 2015/0201429 A1 | 7/2015 | Chen et al. |
| 2016/0219627 A1 | 7/2016 | Au et al. |
| 2016/0337869 A1 | 11/2016 | Dai et al. |
| 2017/0034845 A1* | 2/2017 | Liu ........................ H04L 1/0003 |
| 2017/0079059 A1 | 3/2017 | Li et al. |
| 2017/0163463 A1 | 6/2017 | Werner et al. |
| 2017/0318598 A1 | 11/2017 | Islam et al. |

FOREIGN PATENT DOCUMENTS

| | | |
|---|---|---|
| CN | 105103584 B | 11/2019 |
| WO | 2014090200 A1 | 6/2014 |
| WO | 2015122701 A1 | 8/2015 |
| WO | 2016010217 A1 | 1/2016 |
| WO | 2016053639 A1 | 4/2016 |

OTHER PUBLICATIONS

Qualcomm Technologies Inc., "The 5G Unified Air Interface Scalable to an extreme variation of requirements," Nov. 2015, https://www.qualcomm.com/documents/5g-unified-air-interface-presentation, pp. 1 to 46.

* cited by examiner

SYSTEM AND METHOD FOR COEXISTENCE OF GRANT-FREE AND GRANT-BASED UPLINK TRAFFIC

CROSS REFERENCE TO RELATED APPLICATIONS

This application is a continuation of U.S. patent application Ser. No. 15/142,638 filed Apr. 29, 2016, which is incorporated by reference in its entirety.

FIELD

The present application relates a system and method for coexistence of grant-free uplink traffic with grant-based uplink traffic.

BACKGROUND

In many wireless networks, such as long-term evolution (LTE) networks, the selection of shared data channels for uplink is scheduling/grant-based, and the scheduling and grant mechanisms are controlled by a base station (BS) in the network. A user equipment (UE) sends an uplink scheduling request to the BS. When the BS receives the scheduling request, the BS sends an uplink grant to the UE indicating its dedicated uplink resource allocation. The UE then transmits data on the granted resource. This is a specific example of grant-based uplink traffic.

In contrast, for grant-free traffic, independent of any scheduling request, a UE may be mapped to resources for grant-free transmission. The resources are not dedicated to a UE, and there can be multiple UEs mapped to the same resource. In grant-free transmission, a UE does not rely on a dynamic scheduling request and grant mechanism to transmit data. A given UE that has no data to transmit will not transmit using the mapped resources.

SUMMARY

A broad aspect of the invention provides a method of scheduling grant-based traffic and mapping resources for grant-free traffic. The method includes scheduling uplink grant-based traffic in a first frequency partition. A plurality of UEs are mapped for uplink grant-free transmission to time-frequency regions of a second frequency partition that does not overlap with the first frequency partition by mapping each UE to a respective plurality of time-frequency regions. Uplink grant-based traffic is scheduled in at least one portion of the second frequency partition, such that for at least one UE of said plurality of UEs configured for a plurality of uplink grant-free transmissions that includes an initial grant-free transmission and at least one grant-free retransmission using time-frequency regions indicated by said mapping, at least one of the uplink grant-free transmissions overlaps with the at least one portion of the second frequency partition, and at least one of the uplink grant-free transmissions does not overlap with the at least one portion of the second frequency partition.

Optionally, the scheduling and mapping are subject to a constraint that for any UE of said plurality of UEs that transmits an initial transmission and a fixed number of retransmissions, at most a predetermined number of time-frequency regions used for the UE's initial transmission and retransmissions overlap with the at least one portion of the second frequency partition.

Optionally, differing UEs each transmit differing numbers of retransmissions. A different constraint can be applied depending on the number of retransmissions.

Optionally, scheduling uplink grant-based traffic comprises scheduling enhanced mobile broadband (eMBB) traffic; and mapping the plurality of UEs for uplink grant-free transmission comprises mapping UEs for ultra-reliable low latency (URLL) traffic.

Optionally, mapping a plurality of UEs for uplink grant-free transmission to time-frequency regions of a second frequency partition that does not overlap with the first frequency partition is done such that no two UEs can overlap for both an initial transmission and all retransmissions.

Another broad aspect of the invention provides another method of scheduling grant-based traffic and mapping resources for grant-free traffic. The method includes scheduling uplink grant-based traffic in a first frequency partition. A UE is mapped for an initial uplink grant-free transmission to a time-frequency region of a second frequency partition that does not overlap with the first frequency partition. The UE is also mapped for an uplink grant-free retransmission in at least one portion of the first frequency partition, such that mapped resource for the retransmission is spread across the first frequency partition. A first transmission time unit (TTU) duration is used for grant-based traffic in the first frequency partition, and a second TTU duration is used for grant-free transmission in the second frequency partition, and for grant-free transmission in the at least one portion of the second frequency partition, the second TTU duration being shorter than the first TTU duration.

Another broad aspect of the invention provides a network element comprising a scheduler and a mapper. The scheduler is for scheduling uplink grant-based traffic in a first frequency partition. The mapper is for mapping a plurality of UEs for uplink grant-free transmission to time-frequency regions of a second frequency partition that does not overlap with the first frequency partition by mapping each UE to a respective plurality of time-frequency regions. The scheduler is further configured to schedule uplink grant-based traffic in at least one portion of the second frequency partition. The scheduling is such that for at least one UE of said plurality of UEs configured for a plurality of uplink grant-free transmissions that includes an initial grant-free transmission and at least one grant-free retransmission using time-frequency regions indicated by said mapping, at least one of the uplink grant-free transmissions overlaps with the at least one portion of the second frequency partition, and at least one of the uplink grant-free transmissions does not overlap with the at least one portion of the second frequency partition.

Another broad aspect of the invention provides a network element comprising a scheduler and a mapper. The scheduler is for scheduling uplink grant-based traffic in a first frequency partition. The mapper maps a UE for an initial uplink grant-free transmission to a time-frequency region of a second frequency partition that does not overlap with the first frequency partition. The mapper maps the UE for an uplink grant-free retransmission in at least one portion of the first frequency partition, such that the at least one portion is spread across the first frequency partition. A first TTU duration is used for grant-based traffic in the first frequency partition, and a second TTU duration is used for grant-free transmission in the second frequency partition, and for grant-free transmission in the at least one portion of the second frequency partition, the second TTU duration being shorter than the first TTU duration.

DETAILED DESCRIPTION

Figure 1:
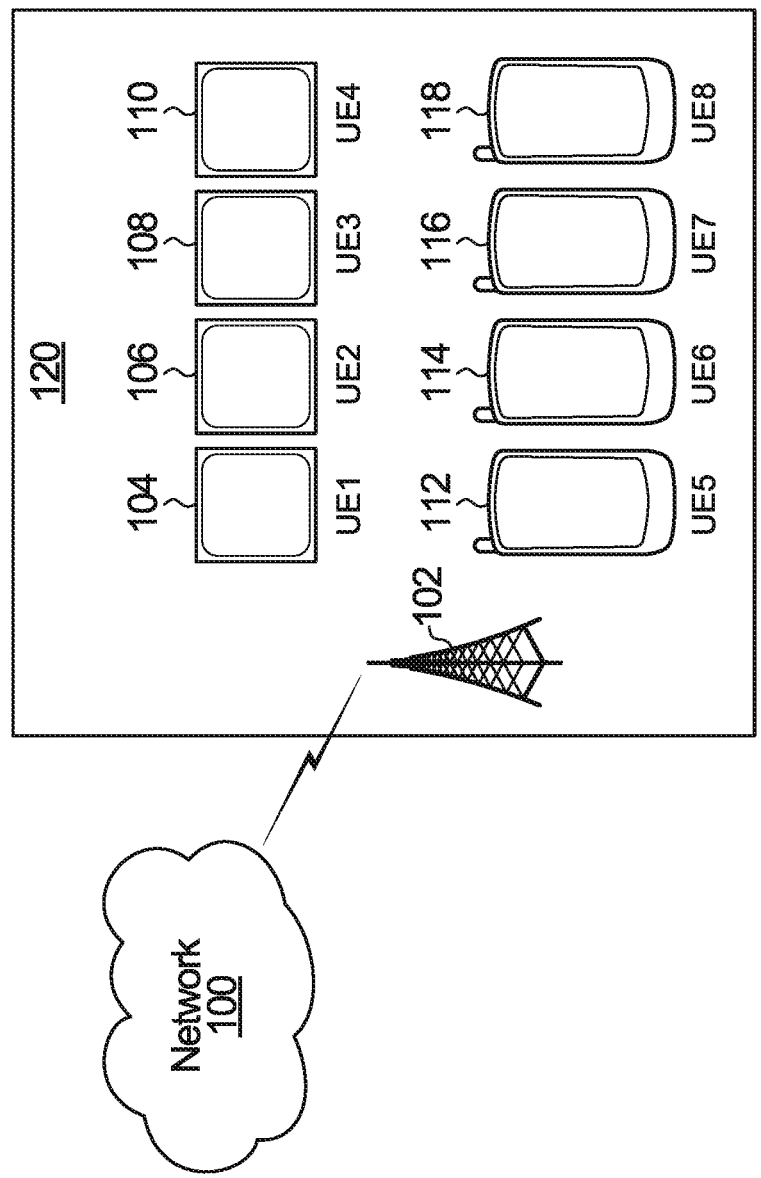
FIG. 1 is a block diagram of a network supporting grant-based UEs and grant-free UEs.

Generally, embodiments of the present disclosure provide a method and system for grant-based traffic to coexist with grant-free traffic for uplink transmissions. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

For the purpose of this description, a grant-free UE is a UE that is configured to transmit grant-free traffic. The UE may also have other capabilities including transmission of grant-based traffic. Grant-free transmission means that a UE does not rely on a dynamic scheduling request and grant mechanism to transmit data. The transmission resources and formats (e.g. coding and modulation schemes) are pre-configured or semi-statically configured. Similarly, a grant-based UE is a UE that is configured to transmit grant-based traffic, but such a UE may also have other capabilities including transmission of grant-free traffic.

Referring to FIG. 1, a schematic diagram of a network too is shown. A base station (BS) 102 provides uplink and downlink communication with the network too for a plurality of user equipment (UEs) 104-118 within a coverage area 120 of the BS 102. In a specific example, UEs 104-110 are UEs that grant-free UEs, and UEs 112-118 are UEs grant-free UEs. In a more specific example, the UEs 104-110 employ OFDMA to transmit enhanced mobile broadband (eMBB) traffic. UEs 112-118 may, for example, transmit traffic which requires ultra reliability and low latency. UEs 112-118 may use grant-free OFDMA or other non-orthogonal access schemes such as sparse code multiple access (SCMA). The BS 102 may, for example, be an access point. FIG. 1 shows one BS 102 and eight UEs 104-118 for illustrative purposes, however a network too may include more than one BS 102 and the coverage area 120 of the BS 102 may include more or fewer than eight UEs 104-118 in communication with the BS 102.

In some embodiments, the BS 102 implements a grant-free uplink transmission scheme in which contention transmission unit (CTU) access regions are defined. Each CTU access region may include a number of CTUs. A CTU is a basic resource, predefined by the network too, for contention based transmissions. Each CTU may be a combination of time, frequency, code-domain, and/or pilot sequence elements. Code-domain elements may be, for example, CDMA (code division multiple access) codes, LDS (low-density signature) signatures, SCMA codebooks, and the like. These possible code-domain elements are referred to generically as "signatures" hereinafter. Multiple UEs may contend for the same CTU. The size of a CTU may be preset by the network too and may take into account an expected number of UEs served and their payload, the amount of desired padding, and/or modulation coding scheme (MCS) levels. The grant-free uplink transmission scheme may be defined by the BS 102, or it may be preconfigured, or configured semi-statically.

Sparse code multiple access (SCMA) is a non-orthogonal waveform with near optimal spectral efficiency that utilizes the shaping gain of multi-dimensional constellations. The utilization of non-orthogonal waveforms in SCMA enables the creation of a multiple-user multiple access scheme in which sparse codewords of multiple layers or UEs are overlaid in code and power domains and carried over shared time-frequency resources. The system is overloaded if the number of overlaid layers is more than the length of multiplexed codewords. Overloading is achievable with moderate complexity of detection due to the sparsity of SCMA codewords. In SCMA, coded bits are directly mapped to sparse codewords selected from layer-specific SCMA codebooks. Due to these benefits, SCMA is a technology suitable for supporting massive connectivity. Furthermore, a blind multi-user reception technique using Message Passing Algorithm (MPA) decoding can be applied to detect UEs' activities and the information carried by them simultaneously. With such blind detection capability, grant-free multiple access can be supported. A detailed description of SCMA schemes can be found in U.S. patent application Ser. No. 13/919,918 filed Jun. 17, 2013, entitled System and Method for Designing and Using Multidimensional Constellations, which application is incorporated herein by reference. A detailed description of an MPA receiver can be found in U.S.

patent application Ser. No. 14/212,583 filed Mar. 14, 2014, entitled Low Complexity Receiver and Method for Low Density Signature Modulation, which application is hereby incorporated herein by reference.

Figure 2:
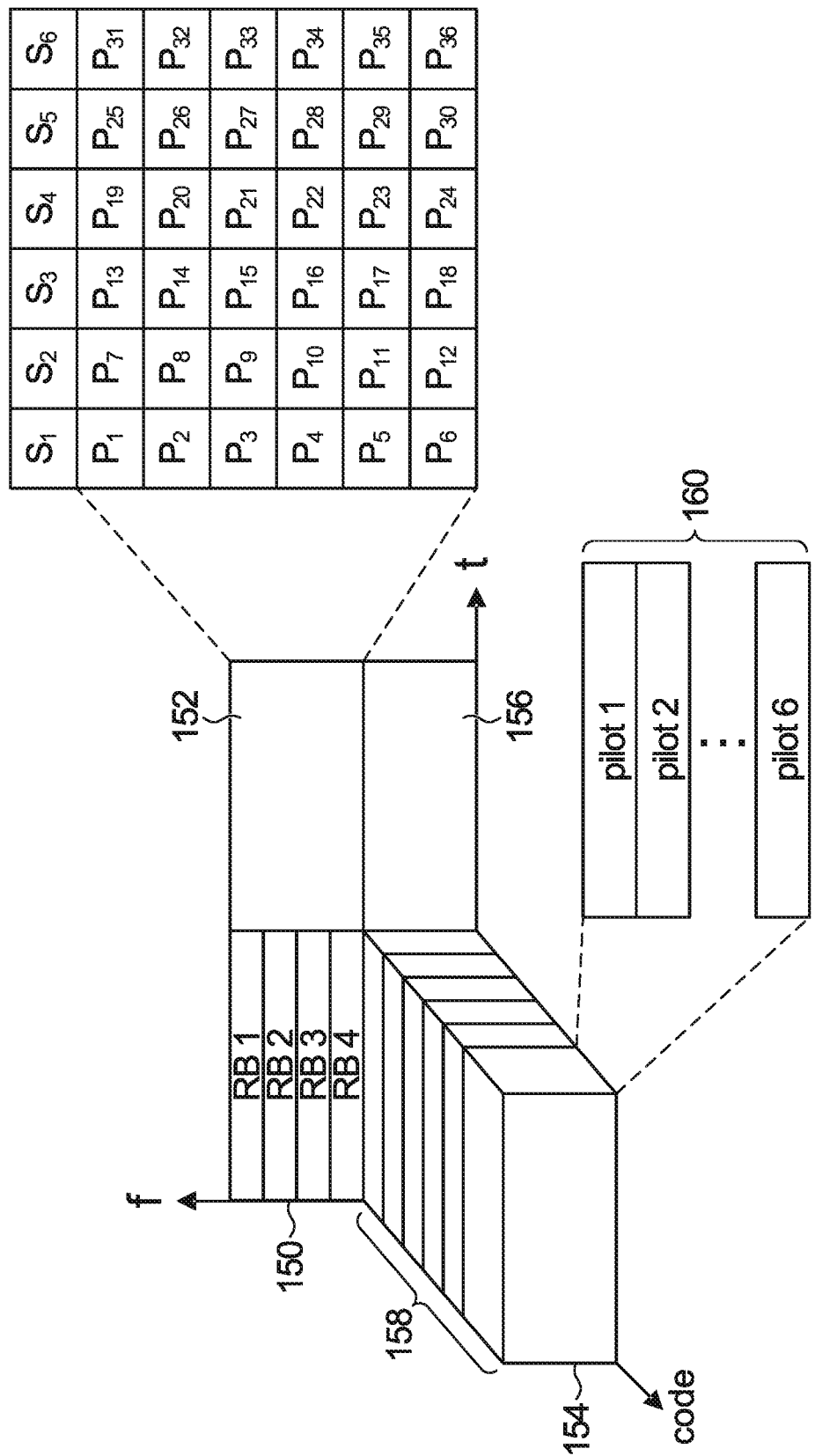
FIG. 2 is an example set of CTU definitions.

Referring now to FIG. 2, shown is an example of resource definition within the grant-free band. In this example, a time frequency resource is divided into four regions 150, 152, 154, 156. Each region occupies four resource blocks. The resource blocks are only shown for region 150 as RB1, RB2, RB3, RB4. In addition, for each region, there can be up to six layers. The layering is only shown for region 154 with the six layers indicated at 158. Within each layer, a respective codebook is used, and in addition, a set of different pilot sequences 160 are used to separate multiple UEs that use the same codebook. Thus, for example, in each layer of the set of layers 158, up to six different UEs can transmit using different pilot sequences. In the example of FIG. 2, there are 36 unique combinations per region. If only 36 UEs are ever assigned to a given region, and each is assigned a unique CTU, then there will be no collision, a collision occurring if two or more UEs transmit with the same CTU. However, if there are a larger number of UEs that need to be able to be mapped to each region, then there will be the possibility of a collision. It is noted that a pilot sequence/signature correlator is used in the receiver to detect each signal.

In some embodiments, the grant-free uplink transmission scheme may assign a unique identifying CTU index $I_{CTU}$, to each CTU in regions 150-156. Referring now to FIGS. 1 and 2 together, UEs 112-118 determine which CTU to transmit on based on mapping rules for mapping each UE 112-118 to an appropriate CTU index. The mapping rules may be defined in a mapping scheme. The mapping scheme may be determined by the BS 102, in which case the mapping scheme is sent to the UEs 112-118 utilizing, for example, high-level signaling from the BS 102 when the UEs 112-118 connect to the BS 102. Alternatively, the mapping scheme may be predefined, in which case the mapping scheme is known at the UEs 112-118 prior to the UEs 112-118 connecting to the BS 102.

Utilizing a mapping scheme enables a UE to automatically transmit data on CTUs as soon as it enters the coverage area 120 of a BS 102, without scheduling signaling between the BS 102 and the UE. The mapping rules may be based on, for example, a UE's dedicated connection signature (DCS), its DCS index assigned by a BS, the total number of CTUs, and/or other parameters such as subframe number.

In a grant-free uplink transmission scheme, in the event of a collision due to multiple UEs simultaneously accessing the same CTU, the BS 102 is unable to estimate the individual channels of the UEs accessing the same CTU and, therefore, cannot decode each UE's transmission information. For example, assume two UEs (UE 112 and 116) are mapped to the same CTU and their channels are $h_1$ and $h_2$. If both UEs transmit simultaneously, the BS 102 can only estimate a channel of quality of $h_1+h_2$ for both UEs 112 and 116, and the transmitted information will not be decoded correctly. However, the BS 102 can implicitly determine which UEs the transmission came from based on the default mapping rules, for example by resolving the headers of each of the transmissions, even though the BS 102 is unable to explicitly determine which UEs were transmitting.

Figure 3B:
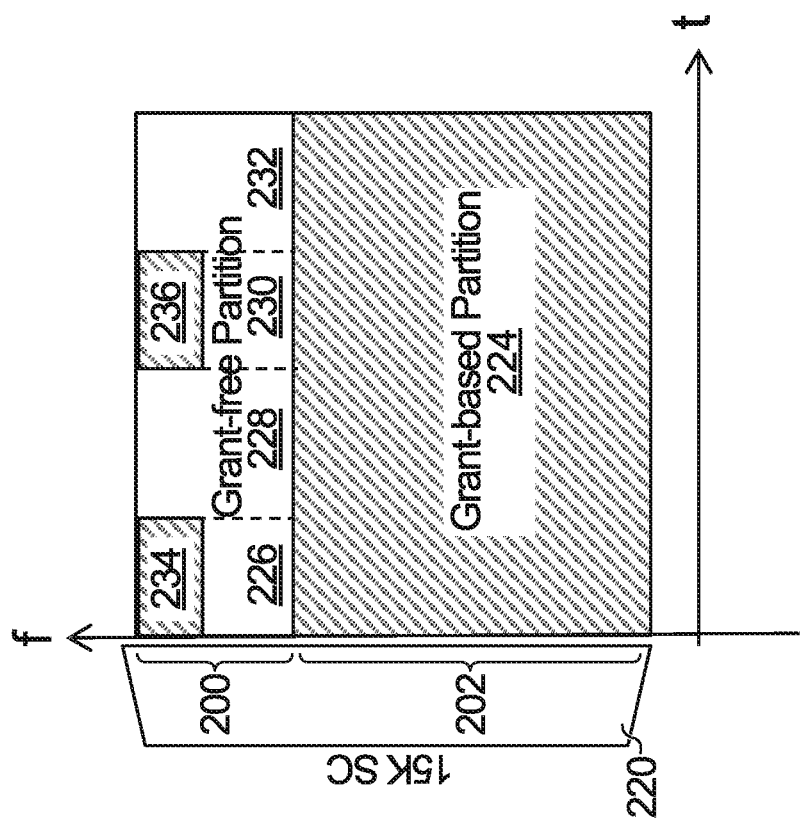
FIG. 3B is a first example of coexistence of traffic for grant-based UEs with traffic for grant-free UEs using a common numerology.
Figure 3A:
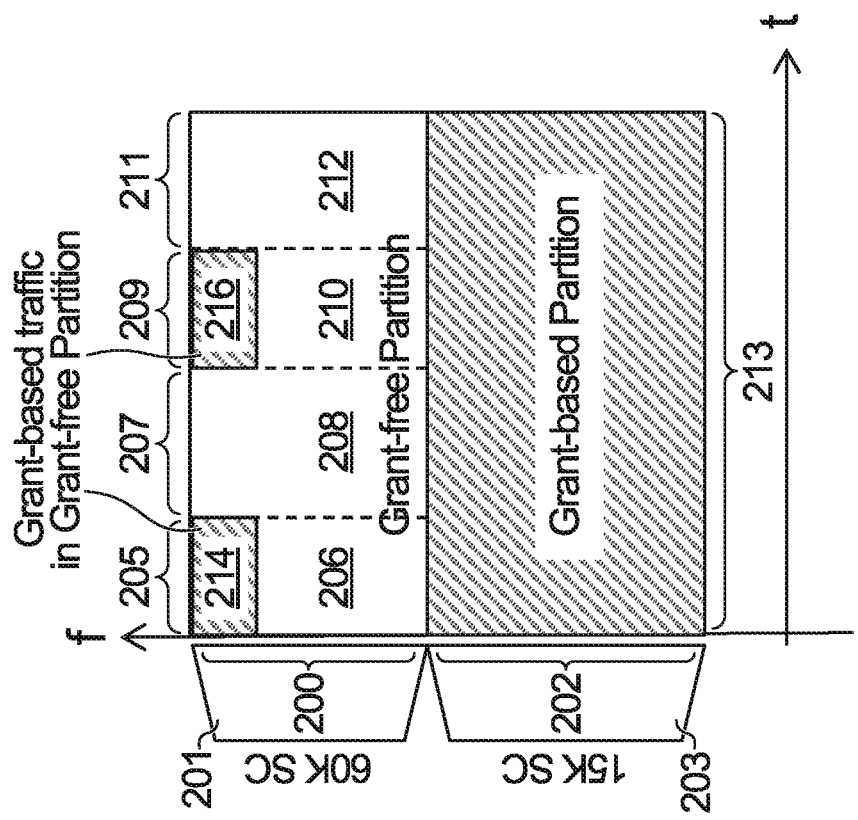
FIG. 3A is a first example of coexistence of traffic for grant-based UEs with traffic for grant-free UEs using different numerologies.

Referring to FIG. 3A, shown is a first example of co-existence of grant-free and grant-based traffic, for example URLL and eMBB traffic. A system bandwidth is divided into two frequency partitions 200, 202. In the example of FIG. 3A, the two partitions 200, 202 are in respective sub-bands 201, 203 having different sub-carrier spacings. The first frequency partition 200 operates with a numerology having a 60 KHz sub-carry spacing, whereas the second frequency partition 202 operates with a numerology having a 15 KHz sub-carrier spacing. In the first frequency partition 200, shown are four TTUs 205, 207, 209, 211 each having a 0.125 ms TTU duration. For the second frequency partition 202, shown is a single TTU 213 having a 0.5 ms TTU duration. The shorter TTU duration used in the first frequency partition is suitable for grant-free traffic requiring low latency. In some embodiments, a structure similar to that of FIG. 2 is employed within frequency partition 200. Within TTUs 205, 207, 209, 211, shown are respective portions 206, 208, 210, 212 within frequency partition 200 that are available for grant-free traffic. Frequency partition 202 is available for transmitting regular scheduled grant-based traffic. In addition, portions of frequency partition 200 are also available for use in transmitting a part of regular scheduled grant-based traffic. In the illustrated example, this includes portions 214, 216 within the grant-free band. It is noted that these grant-based portions 214, 216 overlay the resources available for grant-free traffic. In this example, a different numerology is used for grant-free traffic, and some of the capacity allocated to that numerology is also assigned for grant-based traffic. Because successful detection and reliability is important for grant-free transmission, scheduling of grant-based traffic in the overlay portions within the grant-free band is coordinated with the allocation of the grant-free resources to grant-free traffic, to avoid or mitigate the effect of collisions between the grant-based traffic and the grant-free traffic.

Referring to FIG. 3B, shown is a second example of co-existence of grant-free and grant-based traffic. The example of FIG. 3B is largely similar to FIG. 3A, but instead of having two frequency partitions 200, 202 in respective sub-bands 201, 203 with respective numerologies, shown are frequency partitions 200, 202 within a single band 220 with a 15 kHz sub-carrier spacing. Unlike the FIG. 3A example, in the FIG. 3B example, the grant-free partition 200 and grant-based partition 201 employ the same numerology, however their TTU durations can be different. For example, grant-free low latency UEs may use a TTU with fewer symbols compared to grant-based traffic. The examples that follow assume that differing numerologies are used for grant-free and grant-based (i.e. the example of FIG. 3A), but more generally, any of the approaches described below can also be applied to systems in which a single numerology is used for both traffic types as per the example of FIG. 3B.

Grant-free UEs are configured to transmit an initial grant-free transmission and at least one grant-free retransmission associated with the initial grant-free transmission. There may be a predefined number of retransmissions. For example, a UE can be configured to transmit an initial transmission and one retransmission. Note that the retransmission is made irrespective of whether or not the initial transmission was successfully received and decoded. This method of retransmission mitigates the latency of waiting for an acknowledgement (ACK) or a negative acknowledgement (NACK) prior to retransmission, which may be unacceptable for some grant-free traffic, such as URLL traffic. In some embodiments, one or more configurations are assignable for a given UE in terms of the number of retransmissions the UE is expected to make for each new transmission. This may be updated, for example by long term adaptation.

A partition for grant-free traffic is segmented into different regions to which grant-free UEs may be mapped. In the example of FIG. 3A, partition 200 is segmented into four TTUs 206, 208, 220, 212. UE mapping to the regions is performed, taking into account the number of regions per TTU, and the number of UEs. Co-existence of grant-free traffic with grant-based traffic is designed such that for each grant-free UE, the grant-free traffic has at least one transmission that does not collide with grant-based traffic. In some embodiments, the number of allowable collisions is a configurable parameter, and this may be set depending upon a number of UEs mapped to a region, the UEs' retransmission policy, and how many regions exist per TTU.

Figure 4:
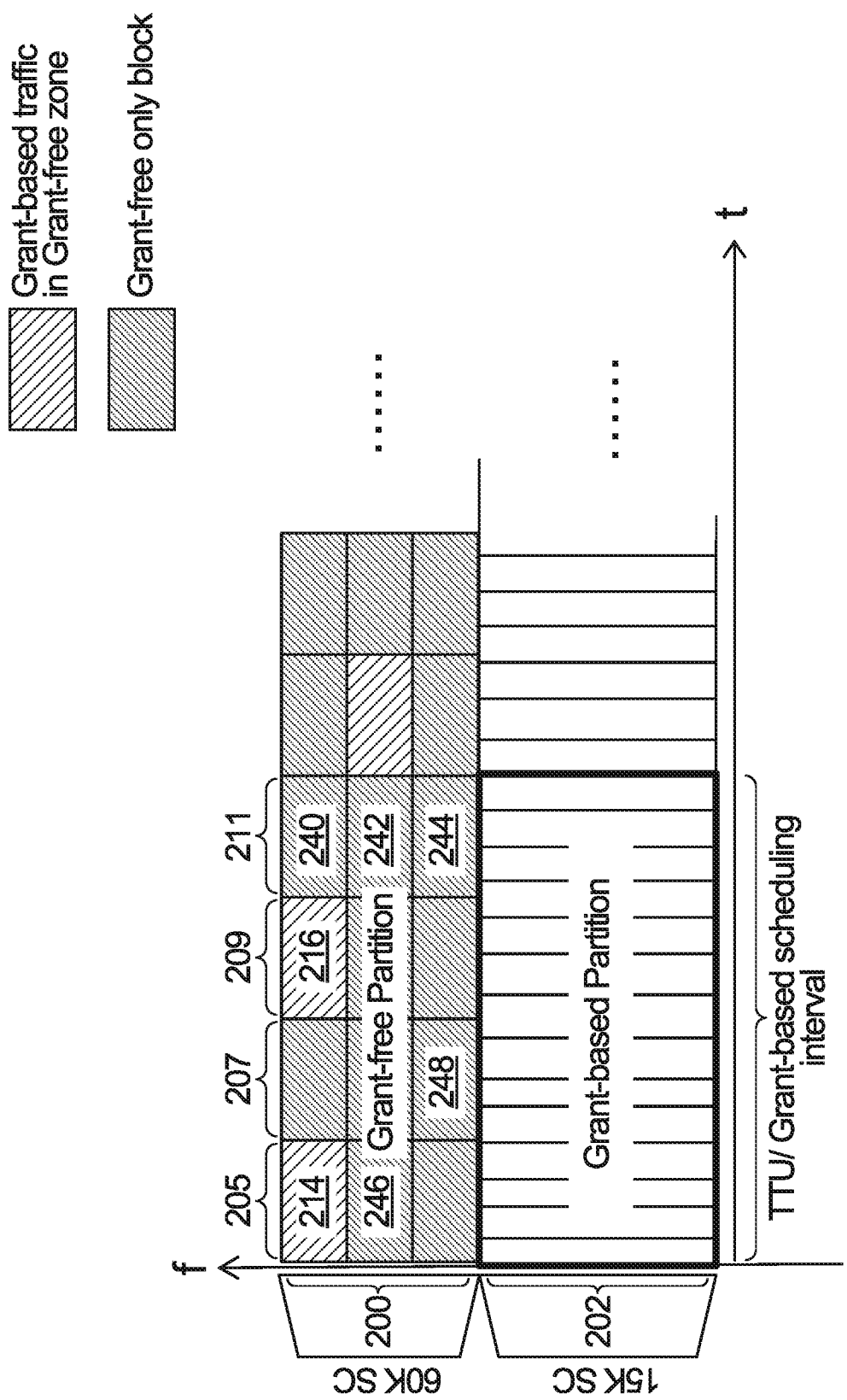
FIG. 4 is another example of coexistence of traffic for grant-based UEs with traffic for grant-free UEs.

A specific example will now be described with a reference FIG. 4. Here, the basic structure is the same as that of FIG. 3A, and the same reference numerals have been used to describe the TTUs for the frequency partition 200 and the frequency partition 202. Each grant-free TTU is divided into three regions. For example, TTU 211 is divided into region 240, 242 and 244. There are a total of 12 regions within TTUs 205, 207, 209, 211. In addition, grant-based traffic is scheduled in the grant-free partition 202 in overlay portions 214, 216.

In the illustrated example, the grant-based scheduling interval used to schedule traffic within the grant-free partition is aligned with a regular 15 KHz TTU scheduling. This is because the grant-based traffic scheduled within the shorter grant-free TTUs is not constrained in the same manner as grant-free traffic, and as such the grant-based traffic can be scheduled together with the normal grant-based traffic and decoded at the end of a TTU, for example at the end of TTU 213 in FIG. 3A.

Grant-free UEs are mapped to specific regions for UL grant-free transmission. In some embodiments, a grant-free UE is configured to use different regions for an initial transmission compared to associated retransmissions. For example, referring again to FIG. 4, a UE that makes an initial transmission in region 246 may be configured to make a retransmission in region 248. This allows for increased diversity between the initial transmission and the retransmission. This can also be used to avoid resource overlap for multiple grant-free UEs for both initial transmissions and retransmissions. Due to a limited number of regions, or a small bandwidth, a unique grouping for successive transmissions may not always be possible. In some embodiments, grant-free UEs are configured to perform CTU hopping to lower the chances of collision. By definition, a different CTU is used for each of an initial transmissions and retransmission, since different TTUs, and hence different times are used. With CTU hopping, some other aspect of the CTU is also different as between the initial transmission and the retransmission. In other words, the code, pilot, frequency combination used for the initial transmission is different than that used for the retransmission. More specifically, in addition to using different regions for an initial transmission and a retransmission, a UE may use different CTUs for the two transmissions. The mapping of UEs to a region may be semi-static based on long term adaptation.

Figure 5:
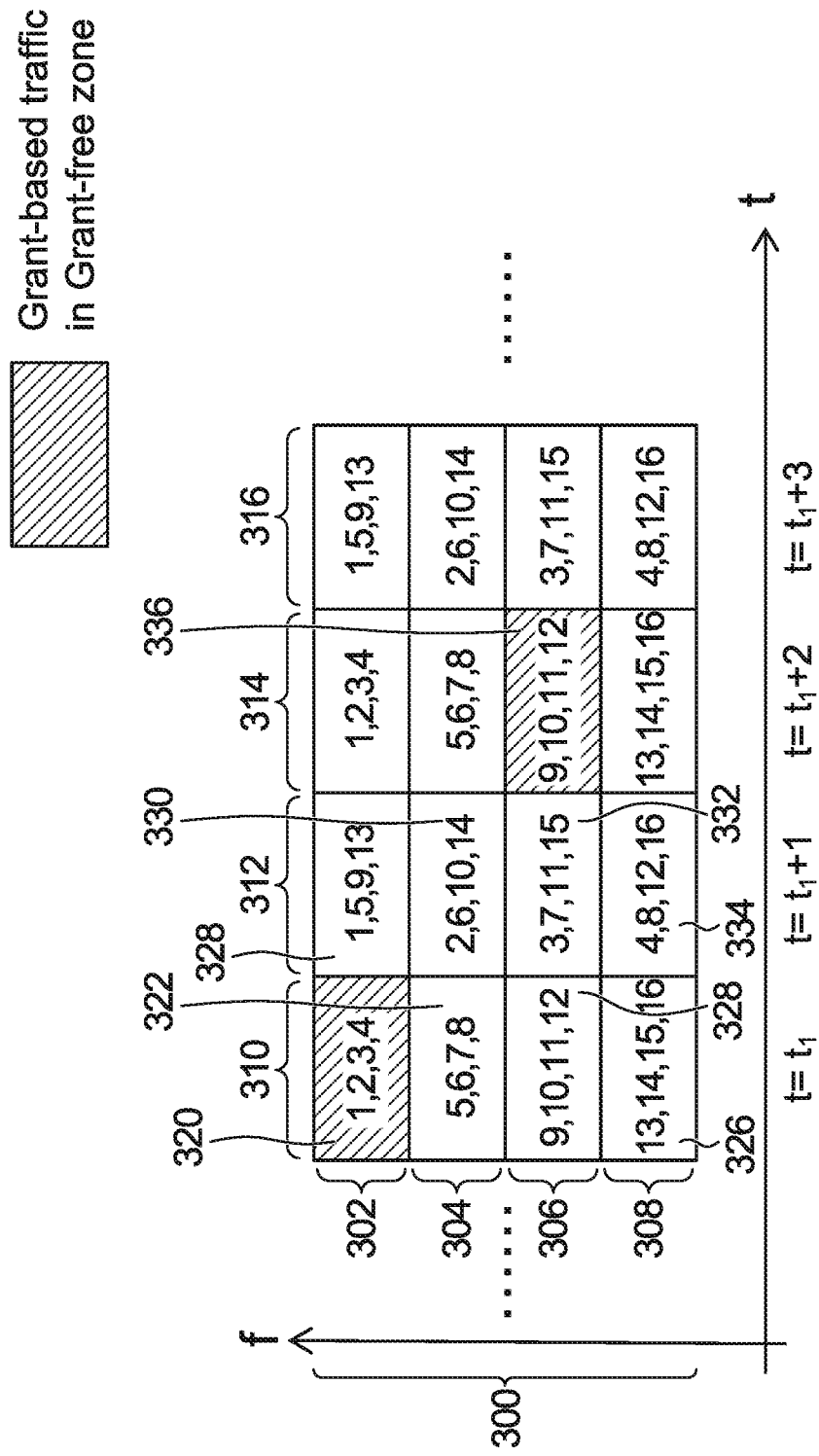
FIG. 5 is an example of mapping grant-free UEs that transmit an initial transmission and one retransmission.

FIG. 5 shows an example in which a grant-free partition 300 is divided into four segments 302, 304, 306, 308 within each of four TTUs 310, 312, 314, 316. In the illustrated example, during TTU 310, this segmentation defines four regions 320, 322, 324, 326. Each region supports up to four UEs in this example. A list of four numbers depicted for each region represents a set of four UEs mapped to that region. A UE being mapped to a given set of regions will make grant-free transmissions using the regions to which it is mapped in a given TTU if it has data to send. However, the UE may or may not have a transmission to make in a given region to which it is mapped. In the illustrated example, during TTU 310, UEs 1, 2, 3, 4 are mapped to segment 320; UEs 5, 6, 7, 8 are mapped to region 322; UEs 9, 10, 11, 12 are mapped to region 324; and UEs 13, 14, 15, 16 are mapped to region 326. From one TTU to the next, the mapping changes. Thus, during TTU 312, UEs 1, 5, 9, 13 are mapped to region 328; UEs 2, 6, 10, 14 are mapped to region 330; UEs 3, 7, 11, 15 are mapped to region 332; and UEs 4, 8, 12, 16 are mapped to region 334. Note that the entire pattern repeats for TTUs 314, 316. In this example it is assumed that each UE makes an initial transmission and a single retransmission. In this example, it can be seen that regions 320 and 328 can be used by UE1 for UE1's initial transmission and retransmission. The mapping is such that there are no other UEs that are in common between both regions 320, 328. Thus, in this particular example, the probability of collision between the same group of UEs in both the initial transmission and retransmission is reduced compared to a situation where the group of UEs use the same resources for initial transmissions and retransmissions.

In addition, it can be seen that grant-based traffic is scheduled in regions 320, 336. It can be seen that there is a potential collision between the traffic of grant-based UEs and the traffic of grant-free UEs 1, 2, 3, 4 in region 320. Similarly, there is a potential for collision between the traffic of grant-based traffic UEs and the traffic of grant-free UEs 9, 10, 11, 12 in region 336. It can be seen that the group of grant-free UEs experiencing a potential collision differs between the two grant-based regions. Thus, potential collisions with grant-based transmissions are distributed over many UEs, and each grant-free UE has grant-free resources available that do not collide with grant-based transmissions.

In the example of FIG. 5, each grant-free UE experiences a potential collision with grant-based traffic a maximum of one time during its initial transmission. More generally, in some embodiments, a defined maximum number of collisions with grant-based traffic is a configurable parameter. By performing an appropriate mapping of UEs to regions and an appropriate definition of the grant-based regions, rules for the maximum number of collisions can be satisfied. For example, a rule may be that as between a UE's initial transmission and its retransmissions, a maximum number K of collisions with grant-based traffic are allowed, where K is a configurable parameter. In the example of FIG. 5, the parameter K is set to one.

In the example of FIG. 5, each region supports four codebook layers, and there are four UEs mapped to be able to transmit on those layers, assuming each UE transmits on one layer. More generally, there may be a larger, in some cases much larger, number of UEs mapped to a given region than there are layers. For example, region 320 may have six layers, and may have 36 UEs mapped to that region, as described by way of example previously with reference to FIG. 2. In that case, some different UE's traffic can be separated by using different codebook and/or pilot sequence. However, it may still be the case that there are more UEs mapped to a region than there are unique combinations of layers, pilot sequences and codebooks. In this case, there is the potential for collision if multiple UEs that are transmitting on the identical resource transmit at the same time. In some embodiments, UEs are configured to employ CTU hopping to lower the chances of collision with the same UE during both an initial transmission and a retransmission.

For example, referring again to FIG. 5, the frequency segment 302 for CTU for transmission for UE2 for region 320 during TTU 310 is different from the frequency segment 304 of the CTU for UE2 for region 330 during TTU 312. The codebook and/or pilot sequence may also be changed as between the initial transmission and the retransmission. This reduces the likelihood that UE2 and another UE transmit using the same first CTU for both region 320, and using the same second CTU for region 330.

In some embodiments, each UE uses a fixed MCS for initial transmissions and retransmissions. In other embodiments, the UE is configured to change the MCS between transmissions. For example, a retransmission may use a lower MCS for more robustness.

In some embodiments, different MCSs may be transmitted over the same region by different UEs. Alternatively, in some embodiments, different divisions are defined for different MCSs.

Figure 6:
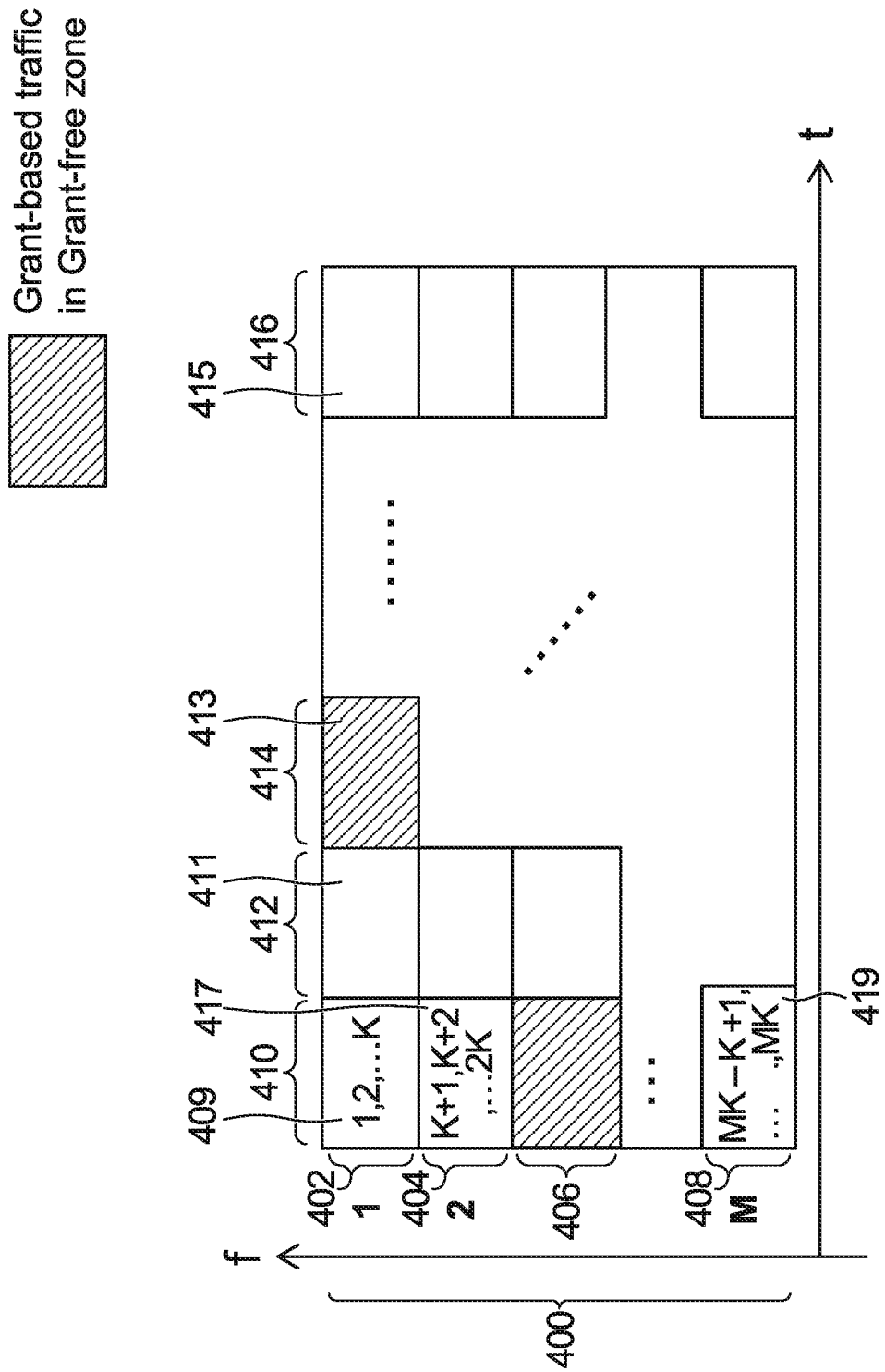
FIG. 6 is example of a generic division of a partition for grant-free transmission into segments, TTUs, and regions.

Referring now to FIG. 6, shown is a more general example of grant-free UE transmission, in co-existence with grant-based traffic. A grant-free partition 400 is divided into M segments 402, 404, 406, . . . , 408. For each segment, there is a respective region in each TTU 410, 412, 414, . . . , 416. For example, shown are regions 409, 411, 413, . . . , 415 in segment 402 during TTUs 410, 412, 414, . . . , 416. Each region can support up to K layers, for a total of MK independent layers that can be supported without collision during each TTU. Equivalently, each region can support MK UEs without collision if each UE transmits on one layer only. However, in some implementations, a UE may be configured to transmit on multiple layers in a region. The mapping of UEs in successive TTUs can be obtained by a simple interleaving, as per the example of FIG. 5, for example, with the objective of having minimal overlap between groupings from one TTU to the next. In the illustrated example, UEs 1, 2, . . . , K are mapped to region 409. UEs K+1, K+2, . . . , 2K are mapped to region 417, . . . , and UEs MK−K+1, . . . , MK are mapped to region 419. An interleaved mapping is used for TTU 212 that avoids overlap in the groups. For example, referring again to FIG. 5, it can be seen that the mapping between TTUs 310, 312 is performed such that for each pair of groups of UEs assigned to a given pair of regions, one in TTU 310, one in TTU 312, there is only one UE common to both groups. Choosing an appropriate pattern assists in defining appropriate regions for assigning to grant-based traffic opportunities.

In some embodiments, grant-based scheduling is based on the worst-case scenario in which it is assumed that all K layers of each grant-free region are used and grant-based UEs may adjust transmit power pre-emptively to keep the interference to grant-free UEs under control.

In the example of FIG. 6, three different use cases will be described. In the first example, described below with reference to FIGS. 7A, 7B, 7C, all UEs retransmit only once. In a second example described below with reference to FIG. 8, all UEs retransmit twice. In a third example described below with reference to FIG. 9, a general scenario is described in which some UEs retransmit once and some UEs retransmit twice. Recall for these figure descriptions that M is the number of regions that the band is divided into and K is the number of layers supported by each region. In all of these examples, the following applies:

For M<K, unique grouping in successive TTU is not possible

At least, initial transmission and retransmissions for each of two UEs/Layers, if made, will collide For M≥K, unique grouping in successive TTU is possible For M≤K, grant-based UEs can be assigned at least one region every second TTU Assigned regions may change to avoid repeated collisions between transmissions of the same group of UEs For M>K, grant-based UEs can be assigned in at least one region every TTU

EXAMPLE 1

All UEs Retransmit Only Once

Figure 7A:
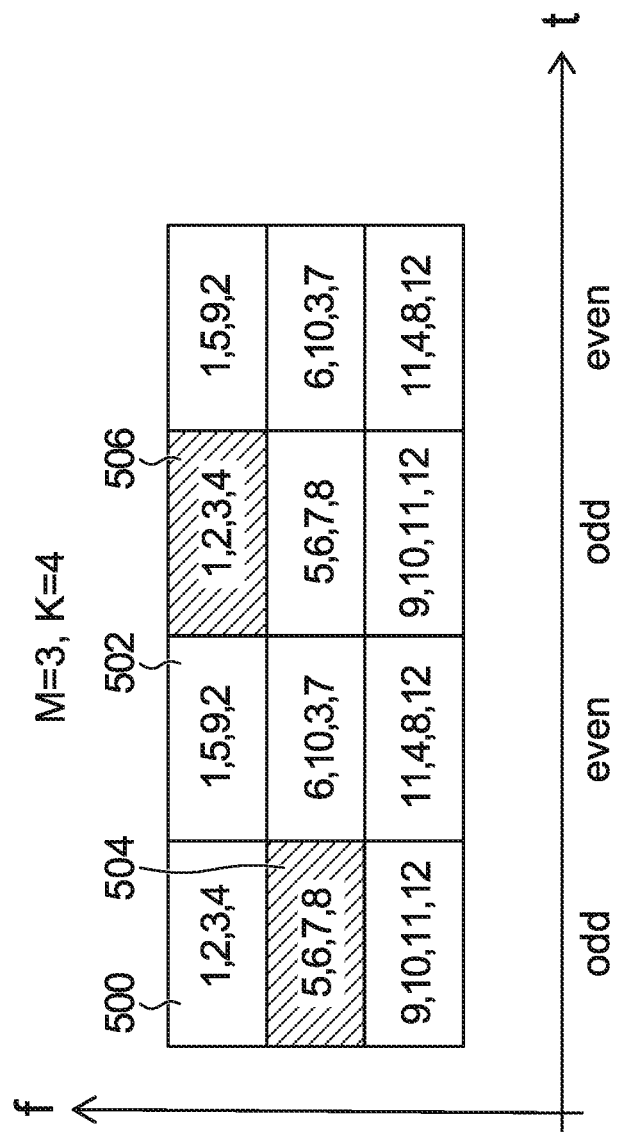
FIGS. 7A, 7B and 7C are three examples of mapping grant-free UEs that transmit an initial transmission and one retransmission.

In the example of FIG. 7A, M=3 and K=4. Because M is less than K, a unique grouping in successive TTUs is not possible. Thus, for example, UEs 1 and 2 are in common between the groups of UEs that are mapped to regions 500, 502. However, in the example of FIG. 7A, grant-based traffic is mapped to regions 504, 506, and there is no grant-free UE that is mapped to both of these two regions. Thus, in the example of FIG. 7A, each UE experiences a potential collision with grant-based traffic at most once. Some of the UEs have an increased probability of collision with other grant-free UEs.

Figure 7B:
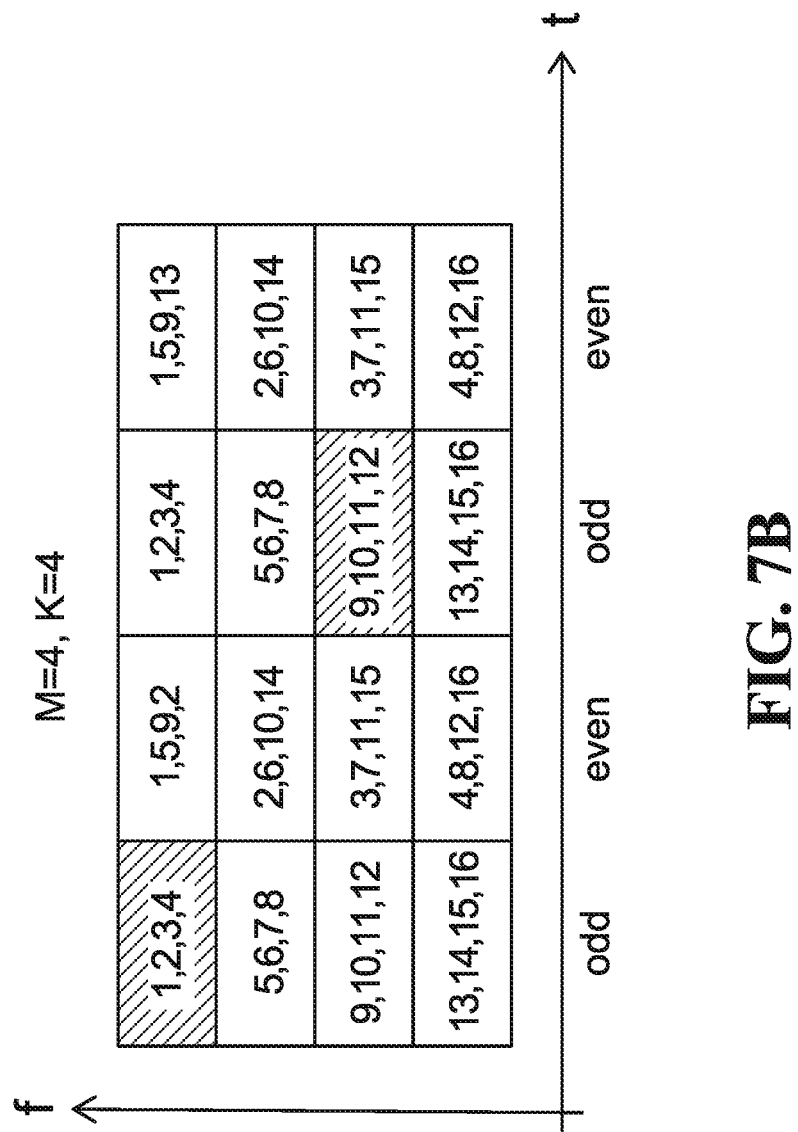

In the example of FIG. 7B, M=4 and K=4. This is equivalent to the example of FIG. 5 described previously. In this case, a unique grouping in successive TTUs is possible.

Figure 7C:
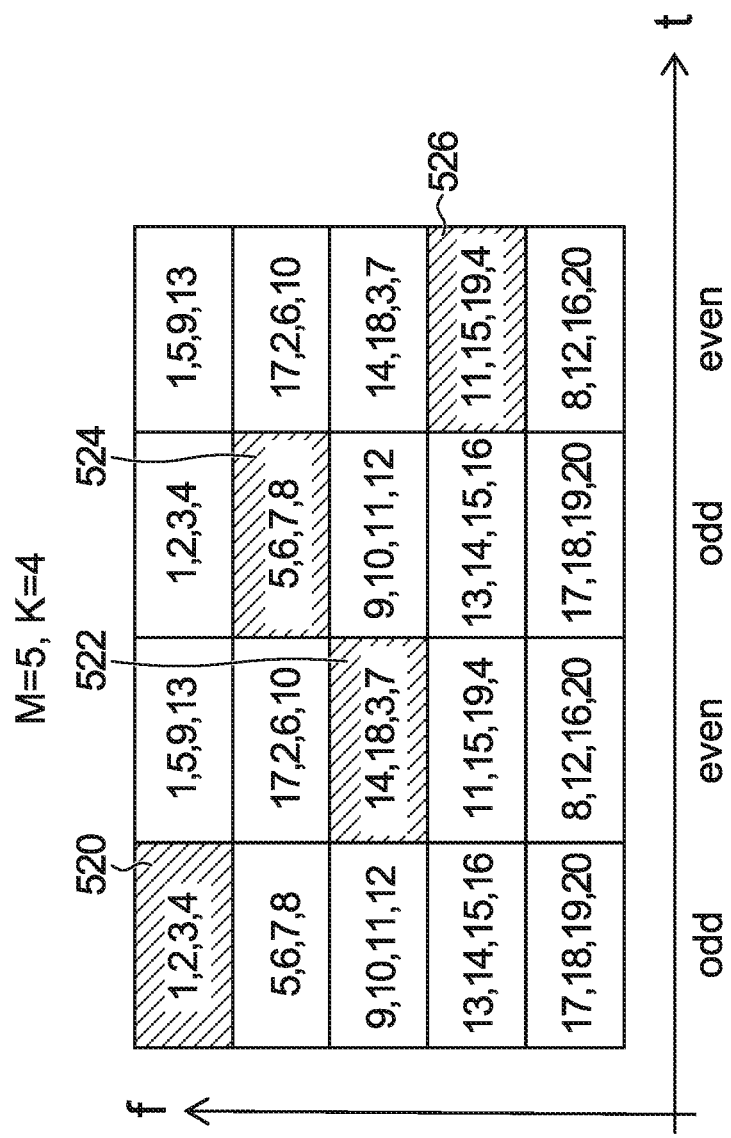

In the example of FIG. 7C, M=5 and K=4. In this case, there again can be a unique grouping in successive TTUs. In addition, a grant-based region can be assigned to at least one region in every TTU. In the illustrated example, there are four TTUs, and there are four assigned grant-based regions 520, 522, 524, 526. Each UE experiences potential collision with grant-based traffic at most for one transmission as between an initial transmission and a single associated retransmission.

EXAMPLE 2

All UEs Retransmit Twice

Figure 8:
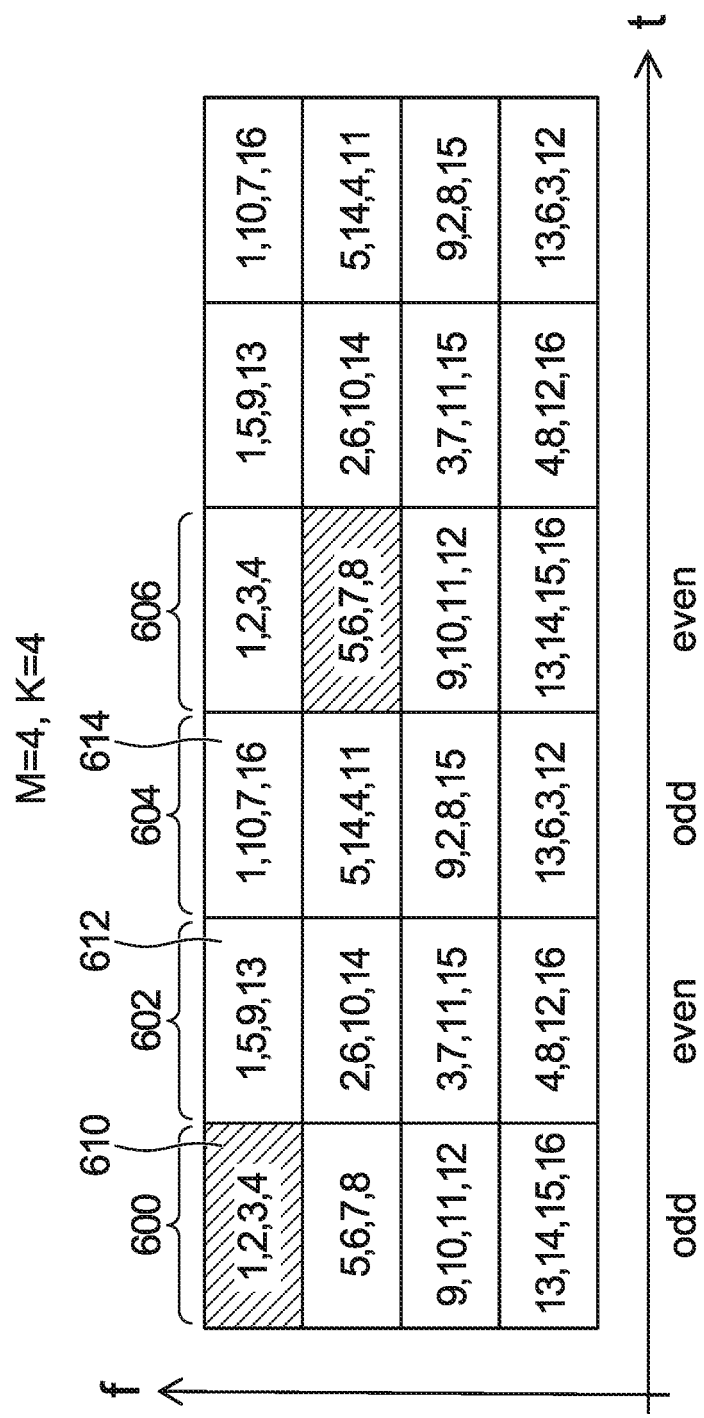
FIG. 8 is an example of mapping grant-free UEs that transmit an initial transmission and two retransmissions.

In the example of FIG. 8, each UE makes two retransmissions after initial transmission. For example, a UE may make an initial transmission during TTU 600 and retransmissions during TTUs 602, 604. However, depending on when the UE has a packet to transmit, the initial transmission could alternatively be made during TTU 602 with retransmissions during 604, 606. A grant-free UE will typically attempt to minimize latency by making the initial transmission during the first available TTU after the packet is available to transmit. In the example of FIG. 8, M=4 and K=4 and as such unique groupings between successive retransmissions are possible. Thus, for the regions 610, 612, 614 to which grant-free UE1 is mapped, there is no other UE that shares more than one of these three regions. In the example of FIG. 8, the rule for grant-based assignment is that at most one transmission of a given UE (between its initial transmission and two retransmissions) can be subject to a potential collision with grant-based traffic. With that constraint, a grant-based assignment can be made in one region of the first three TTUs, and one region of the second three TTUs.

EXAMPLE 3

General Scenario—Some UEs Transmit Once and Other UEs Transmit Twice

Figure 9:
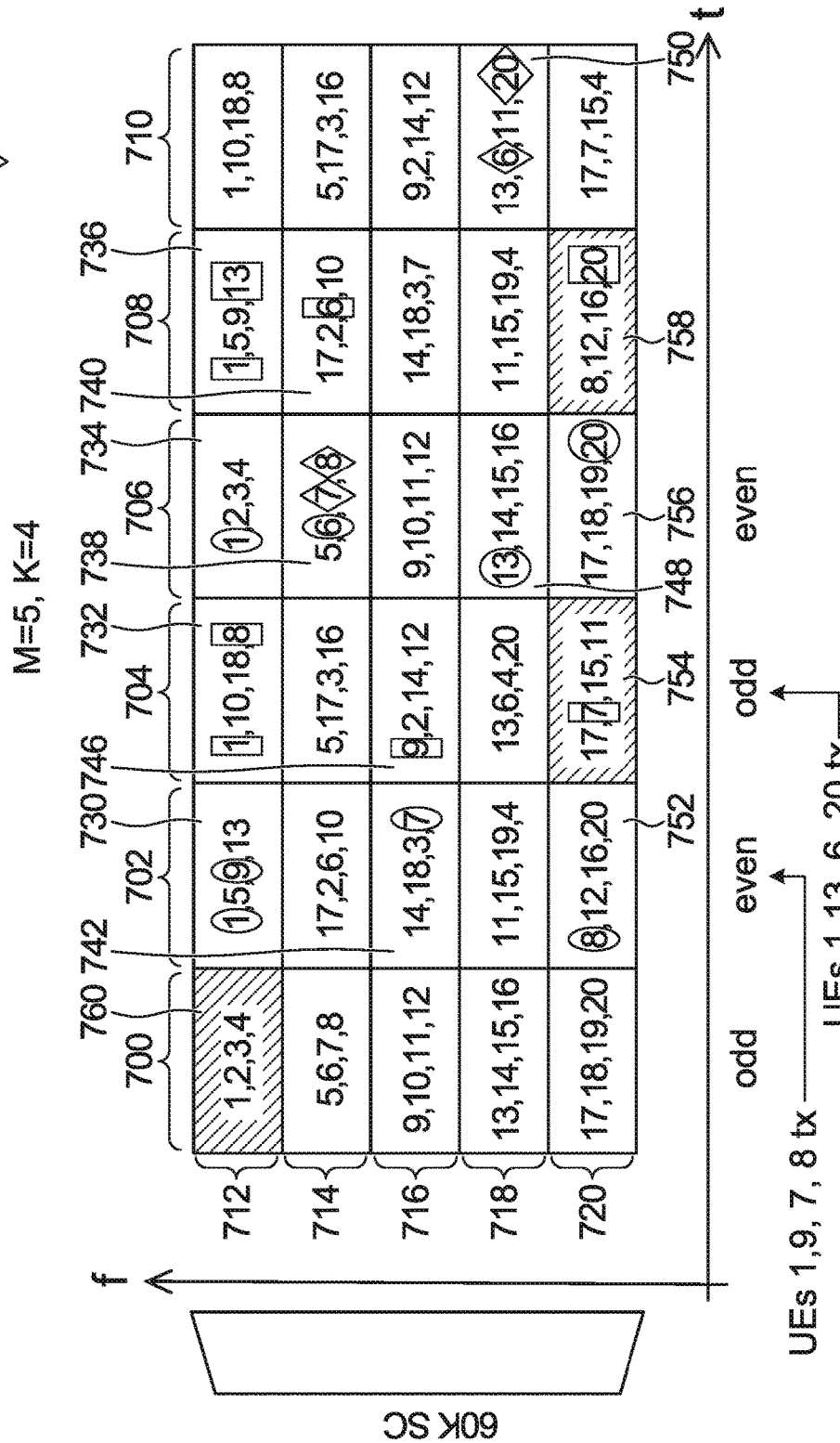
FIG. 9 is an example mapping grant-free UEs that transmit an initial transmission and one retransmission together with UEs that transmit an initial transmission and two retransmissions.

Referring now to FIG. 9, shown is an example in which some UEs retransmit once and some retransmit twice. This can be generalized to a situation where there are sets of UEs that each transmits a respective number of retransmissions. In this example, after a given UE's packet arrives, it is transmitted in the next available TTU. However, other variations are possible. For example, in a time division duplex implementation, a UE may need to wait a certain amount of time before an uplink slot can be used. Shown are example transmissions for six TTUs 700, 702, 704, 706, 708, 710. In this case, there are five segments 712, 714, 716, 718, 720. UEs 1, 9, 13 are configured to retransmit once and UEs 7, 8, 6, 20 are configured to re-transmit twice. Initial transmissions are shown as a UE number with a circle around it; first retransmissions are shown with a UE number with a square around it; finally, second retransmissions are shown with a UE number with a diamond around it text. Where a region contains a number that is not in a circle, not in a square, and not in a diamond, this means that that UE had the opportunity to make a grant-free transmission but did not make one. For UE 1, shown is an initial transmission in region 730 and a retransmission in region 732. Another initial transmission is performed for UE 1 in region 734 and a retransmission in region 736. For UE 9, shown is an initial transmission in region 730 and a retransmission in region 746. For UE 13, shown is an initial transmission in region 748 and a retransmission in region 736.

Recall that UEs 7, 8, 6, 20 perform two retransmissions. Thus, an initial transmission is shown for UE 7 in region 742 with retransmissions in regions 754 and 738. An initial transmission for UE 8 is shown in region 752 with retransmissions in regions 732, 738. An initial transmission for UE 6 is shown in region 738 with retransmissions in regions 740, 750. For UE 20, an initial transmission is shown in region 756 with retransmissions in regions 758, 750. In this example, some UEs are configured for a single retransmission, and other UEs are configured for two retransmissions. In this example, grant-based transmissions take place in regions 760, 754, 758. With the mapping illustrated, each UE experiences a potential collision with grant-based traffic at most once for its initial transmission and any of the retransmissions of the same packet. In addition, because M=5 and K=4, there is a unique grouping for successive retransmissions.

Figure 10:
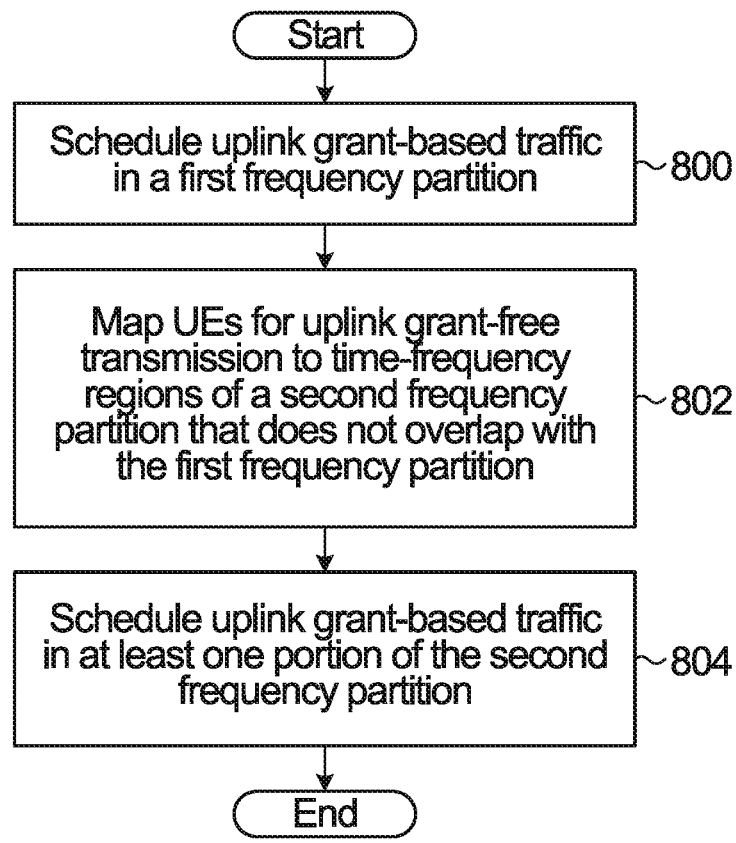
FIG. 10 is a flowchart of a first method of scheduling uplink grant-based traffic and mapping uplink grant-free traffic.

Referring now to FIG. 10, shown is a flowchart of a general method of scheduling uplink grant-based traffic and mapping resources for grant-free transmission. The methods described above are specific example implementations of this method. In block 800, uplink grant-based traffic is scheduled in a first frequency partition. In block 802, UEs are mapped for uplink grant-free transmission to time-frequency regions of a second frequency partition that does not overlap with the first frequency partition. This involves mapping each UE to a respective plurality of time-frequency regions. In block 804, uplink grant-based traffic is scheduled in at least one portion of the second frequency partition. At least one of the UEs is configured for a plurality of uplink grant-free transmissions that includes an initial grant-free transmission and at least one grant-free retransmission using time-frequency regions indicated by said mapping. The mapping and the scheduling are such that at least one of the uplink grant-free transmissions overlaps with the at least one portion of the second frequency partition, and at least one of the uplink grant-free transmissions does not overlap with the at least one portion of the second frequency partition.

Figure 11:
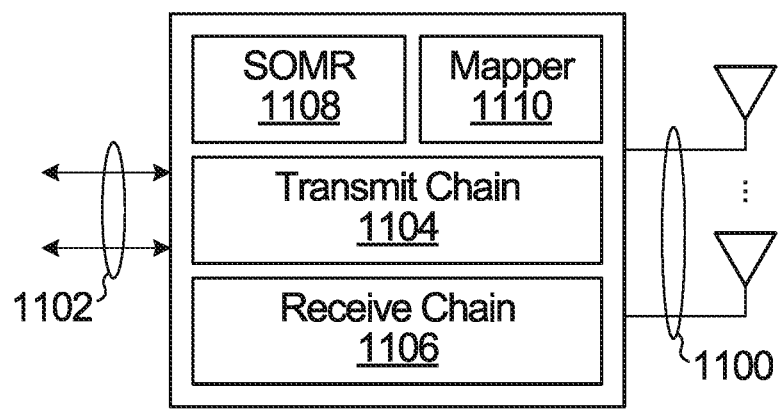
FIG. 11 is a block diagram of a first network element that schedules uplink grant-based traffic and maps uplink grant-free traffic.

FIG. 11 is a block diagram of a network element that schedules uplink grant-based traffic and maps resources for grant-free transmission. The network element includes an SOMR (Scheduler with Overlap with Mapped Resources) 1108 and a mapper 1110. The SOMR 1108 and the mapper together perform scheduling and mapping, using the method of FIG. 10, for example, or one of the other methods described above. The network element may, for example, be a base station, in which case other components such as antennas 1100, a transmit chain 1104 and a receive chain 1106, and network connections 1102 are present. In a specific implementation, the network element of FIG. 11 may include a processor and memory containing instructions that implement the mapper and scheduler.

Figure 12:
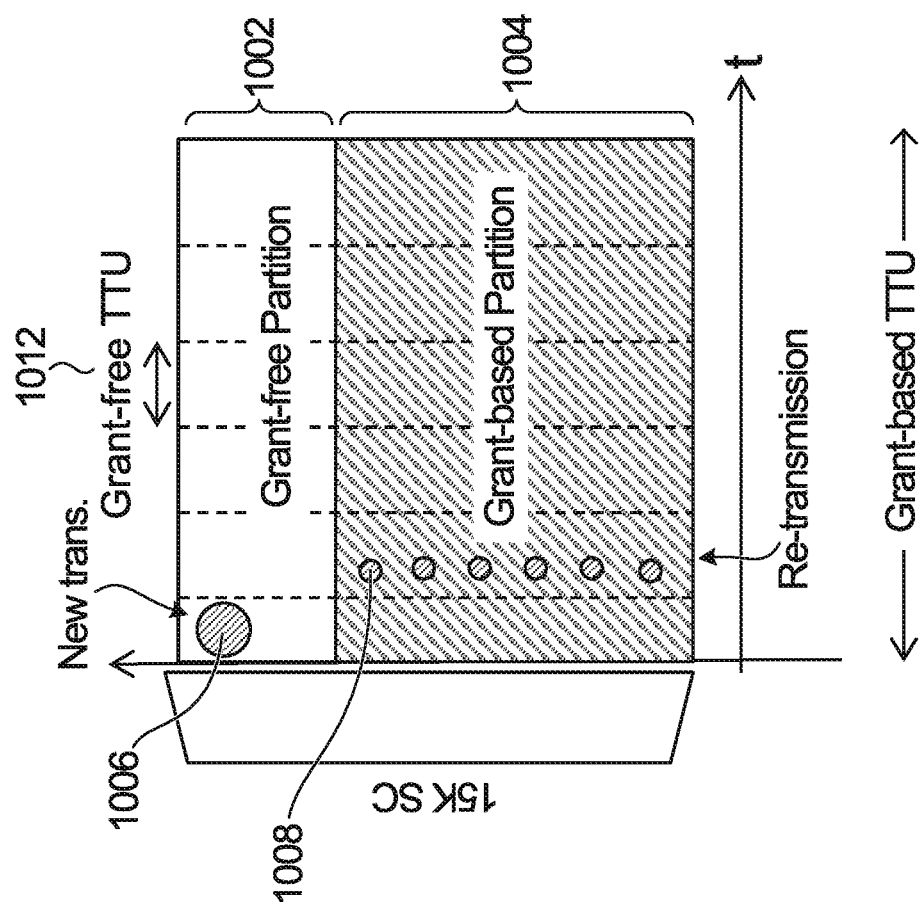
FIG. 12 is an example of mapping grant-free UEs to transmit an initial retransmission in a partition for grant-free traffic, and a retransmission using resources within a partition for grant-based traffic. uplink grant-based traffic and mapping uplink grant-free traffic.

In another embodiment, grant-free transmissions are performed using resources that overlap with those allocated for grant-based traffic. Grant-free transmissions transmitted in the overlapping resources may, for example, use a lower code rate compared to grant-free transmissions transmitted on resources dedicated to grant-free traffic, and may be spread in frequency over a large grant-based frequency space. An example is shown in FIG. 12 where a frequency band allocated to a numerology with a 15 KHz sub-carrier spacing is divided into a first partition 1002 that is dedicated to grant-free transmissions, and a second partition 1004 that is used for scheduled grant-based transmissions. A relatively high rate transmission is depicted at 1006 as an initial grant-free transmission for a grant-free UE. A retransmission is indicated at 1008 using a lower rate code. The retransmission 1008 uses a time frequency resource that is overlaid over the second partition 1008. In addition, the time frequency resource used for retransmission 1008 is spread in frequency over the second partition 1004. In the example of FIG. 10, a grant-based TTU is shown at 1010, and a grant-free TTU is indicated at 1012. The initial transmission 1006 is immediately followed by the retransmission 1008 in the following grant-free TTU for low latency for the grant-free transmissions.

In a specific example, the re-transmission uses a lower code rate, hence there is a larger number coded bits to be transmitted for the re-transmission. These can be spread over the grant-based partition band, which may be much wider than grant-free partition. This provides robustness against possible collision with grant-based traffic. Here, spreading over wider band also exploits frequency diversity. Spreading over a wider band also exploits frequency diversity. As an example, the grant-based partition is 40 resource blocks wide, with each resource block having 12 resource elements, for a total of 40*12=480 resource elements (REs) in each OFDM symbol. If there is a grant-free transmission with 24 bits to transmit that uses ¼ code rate, there are 96 coded bits. With QPSK, this corresponds to 48 symbols which are mapped to 48 resource elements out of the 480 resource elements of an OFDM symbol in the grant-based partition. These 48 symbols can be spread across this partition, for example by transmitting one symbol on every $10^{th}$ resource element.

Figure 13:
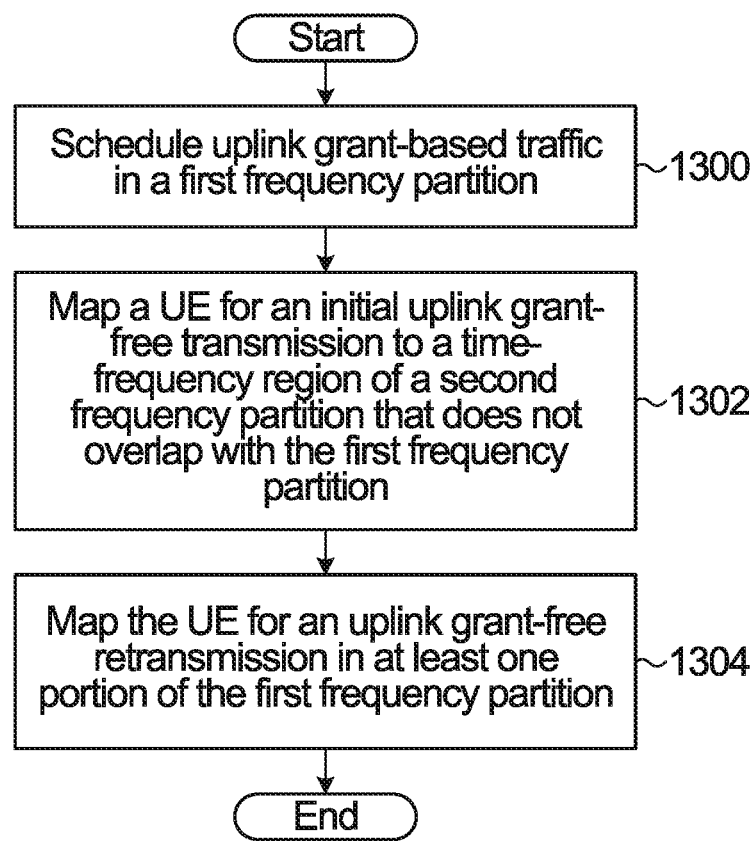
FIG. 13 is a flowchart of a second method of scheduling uplink grant-based traffic and mapping uplink grant-free traffic.
Figure 14:
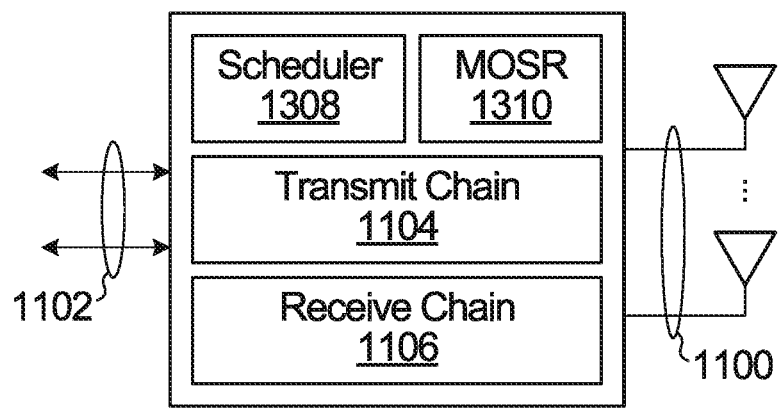
FIG. 14 is a block diagram of a second network element that schedules uplink grant-based traffic and maps uplink grant-free traffic.

FIG. 14 is a block diagram of a network element that schedules uplink grant-based traffic and maps resources for grant-free transmission. The network element includes a scheduler 1308 and an MOSR (Mapper that Overlaps with Scheduled Resources) 1310. The scheduler 1308 and the MOSR 1310 together perform scheduling and mapping, using the method of FIG. 13. The network element may, for example, be a base station, in which case other components such as antennas 1100, a transmit chain 1104 and a receive chain 1106, and network connections 1102 are present. In a specific implementation, the network element of FIG. 14 may include a processor and memory containing instructions that implement the mapper and scheduler.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
receiving, by a user equipment (UE) from a base station (BS), a high-level signaling indicating a resource allocation that allocates, to the UE, first resource(s) for an initial grant free uplink transmission of a data packet and second resource(s) for grant free uplink retransmission(s) of the data packet, the first resource(s) and the second resource(s) being within the same partition of an uplink channel,
wherein the high-level signaling further includes an assignment indicating a number of grant free retransmissions for the data packet, the assignment being specific to the UE; and
transmitting, by the UE, the initial grant free uplink transmission of the data packet and the grant free uplink retransmission(s) of the data packet, the initial grant free uplink transmission being transmitted via the first resource(s), and the grant free uplink retransmission(s) of the data packet being transmitted via the second resource(s) based on the resource allocation indicated by the high-level signaling and the number of grant free retransmissions indicated by the assignment in the high-level signaling; and
wherein transmitting the initial grant free uplink transmission of the data packet and the grant free uplink retransmission(s) of the data packet comprises:
transmitting, by the UE, the initial grant free uplink transmission of the data packet and the grant free uplink retransmission(s) of the data packet without determining whether the initial grant free uplink transmission has been successfully transmitted.

2. The method of claim 1, wherein the first resource(s) are located in a frequency partition, the first resource(s) being time frequency resources dedicated to grant-free transmissions.

3. The method of claim 1, wherein the grant free uplink retransmission(s) of the data packet are transmitted using a different modulation and coding scheme (MCS) than the initial grant free uplink transmission of the data packet.

4. The method of claim 1, wherein the resource allocation allocates different frequency resources to the initial grant free uplink transmission of the data packet than to the grant free uplink retransmission(s) of the data packet.

5. A method comprising:
transmitting, from a base station (BS) to a user equipment (UE), a high-level signaling indicating a resource allocation that allocates, to the UE, first resource(s) for an initial grant free uplink transmission of a data packet and second resource(s) for grant free uplink retransmission(s) of the data packet, the first resource(s) and the second resource(s) being within the same partition of an uplink channel,
wherein the high-level signaling further includes an assignment indicating a number of grant free retransmissions for the data packet, the assignment being specific to the UE; and
receiving, by the BS, the initial grant free uplink transmission of the data packet and the grant free uplink retransmission(s) of the data packet, the initial grant free uplink transmission being received via the first resource(s) and the grant free uplink retransmission(s) of the data packet being received via the second resource(s) based on the resource allocation indicated by the high-level signaling and the number of grant free retransmissions indicated by the assignment in the high-level signaling, wherein the grant free uplink retransmission(s) of the data packet are from the UE without the UE determining whether the initial grant free uplink transmission has been successfully transmitted.

6. The method of claim 5, wherein the first resource(s) are located in a frequency partition, the first resource(s) being time frequency resources dedicated to grant-free transmissions.

7. The method of claim 5, wherein each of the grant free uplink retransmission(s) of the data packet are transmitted using a different modulation and coding scheme (MCS) than the initial grant free uplink transmission of the data packet.

8. The method of claim 5, wherein the resource allocation allocates different frequency resources to the initial grant free uplink transmission of the data packet than to the grant free uplink retransmission(s) of the data packet.

9. A user equipment (UE) comprising:
a processor; and
a non-transitory computer readable storage medium storing programming for execution by the processor, the programming including instructions that cause the UE to:
receive, from a base station (BS), a high-level signaling indicating a resource allocation that allocates, to the UE, first resource(s) for an initial grant free uplink transmission of a data packet and second resource(s) for grant free uplink retransmission(s) of the data packet, the first resource(s) and the second resource(s) being within the same partition of an uplink channel,
wherein the high-level signaling further includes assignment indicating a number of grant free retransmissions for the data packet, the assignment being specific to the UE; and
transmit the initial grant free uplink transmission of the data packet and the grant free uplink retransmission(s) of the data packet, the initial grant free uplink transmission being transmitted via the first resource(s), and the grant free uplink retransmission(s) of the data packet being transmitted via the second resource(s) based on the resource allocation indicated by the high-level signaling and the number of grant free retransmissions indicated by the assignment in the high-level signaling; and wherein the instructions further cause the UE to:
transmit the initial grant free uplink transmission of the data packet and the grant free uplink retransmission(s) of the data packet without determining whether the initial grant free uplink transmission has been successfully transmitted.

10. The UE of claim 9, wherein the first resource(s) are located in a frequency partition, the first resource(s) being time frequency resources dedicated to grant-free transmissions.

11. The UE of claim 9, wherein the grant free uplink retransmission(s) of the data packet are transmitted using a different modulation and coding scheme (MCS) than the initial grant free uplink transmission of the data packet.

12. The UE of claim 9, wherein the resource allocation allocates different frequency resources to the initial grant free uplink transmission of the data packet than to the grant free uplink retransmission(s) of the data packet.

13. A base station comprising:
a processor; and
a non-transitory computer readable storage medium storing programming for execution by the processor, the programming including instructions that cause the base station to:
transmit, to a user equipment (UE), a high-level signaling indicating a resource allocation that allocates, to the UE, first resource(s) for an initial grant free uplink transmission of a data packet and second resource(s) for grant free uplink retransmission(s) of the data packet, the first resource(s) and the second resource(s) being within the same partition of an uplink channel, wherein the high-level signaling further includes an assignment indicating a number of grant free retransmissions for the data packet, the assignment being specific to the UE; and receive the initial grant free uplink transmission of the data packet and the grant free uplink retransmission(s) of the data packet, the initial grant free uplink transmission being received via the first resource(s), and the grant free uplink retransmission(s) of the data packet via being received the second resource(s) based on the resource allocation indicated by the high-level signaling and the number of grant free retransmissions indicated by the assignment in the high-level signaling, wherein the grant free uplink retransmission(s) of the data packet are from the UE without the UE determining whether the initial grant free uplink transmission has been successfully transmitted.

14. The base station of claim 13, wherein the first resource(s) are located in a frequency partition, the first resource(s) being time frequency resources dedicated to grant-free transmissions.

15. The base station of claim 13, wherein each of the grant free uplink retransmission(s) of the data packet are transmitted using a different modulation and coding scheme (MCS) than the initial grant free uplink transmission of the data packet.

16. The base station of claim 13, wherein the resource allocation allocates different frequency resources to the initial grant free uplink transmission of the data packet than to the grant free uplink retransmission(s) of the data packet.

* * * * *